United States Patent [19]
Suggitt et al.

[11] 3,834,329
[45] Sept. 10, 1974

[54] APPARATUS FOR APPLYING PRESERVATIVE MATERIAL TO ERECTED POLES AND THE LIKE

[76] Inventors: John W. Suggitt, 11 Farningham, Islington, Ontario; Walter V. Inkis, 86 Oxford St., Kitchener, Ontario, both of Canada

[22] Filed: Sept. 2, 1971

[21] Appl. No.: 177,218

[52] U.S. Cl.............................. 111/6, 21/7, 21/62, 21/63, 61/53.74
[51] Int. Cl.......................... A01c 23/02, B27k 3/02
[58] Field of Search........ 21/7, 62, 63; 52/168, 515; 111/6; 61/63.75, 54

[56] References Cited
UNITED STATES PATENTS
3,450,073  6/1969  Baker...................................... 111/6
3,595,182  7/1971  Clapp...................................... 111/6

*Primary Examiner*—Barry S. Richman
*Attorney, Agent, or Firm*—Rideout & Maybee

[57] ABSTRACT

An apparatus for applying preservative grease to an erected utility pole or the like comprises an injection tool in the form of a spade adapted to be driven into the ground, the spade providing internal passageways opening into the concave operative face of the spade. The spade is actuated by a hydraulic ram, powered by the preservative material under pressure, the ram serving also as a metering device for regulating the quantities of material injected in accordance with the vertical movements of the spade.

4 Claims, 3 Drawing Figures

PATENTED SEP 10 1974

3,834,329

Inventors
John W. Suggitt
Walker V. Inkis

By Maybee & Legris
Attorneys

APPARATUS FOR APPLYING PRESERVATIVE MATERIAL TO ERECTED POLES AND THE LIKE

This invention relates to an apparatus for applying preservative material to erected poles, that is to say, wooden poles, posts or mast structures including erected utility poles, guard-rail posts, fence posts, bridge support timbers, foundatin timbers and the like.

Utility poles and other wood structures are commonly subject to deterioration due to decay or insect attack at and immediately below ground level, and such deterioration may necessitate frequent replacement of the poles. It is known that such deterioration may be prevented or arrested by applying a suitable preservative material around the bases of the poles, but known methods which rely upon the excavation of soil around the poles are generally expensive in terms of labour costs, and inconvenient when the poles stand on private or cultivated garden sites. It is also known to apply the preservative material without excavation, by injecting the material directly into the ground around the base of a pole; this method, is often inefficient and wasteful in terms of the quantity of preservative material required.

The present invention provides an apparatus whereby preservative material can be injected into the ground around the base of a pole, which apparatus is more convenient to operate and to transport than known forms of such apparatus, and which is more efficient in use.

The apparatus of the present invention comprises an injection tool in the form of a spade adapted to be driven vertically into the ground, the spade providing internal passageways opening into an operative face of the spade. The spade is driven into the ground and withdrawn therefrom by reciprocatory means connected to the spade, control means being provided to control the flow of preservative material to the passageways in accordance with the operation of the reciprocatory power means whereby to effect ejection of the material through the openings in the operative face in accordance with movements of the spade.

The preservative material would normally be a fungicidal grease such as for example, a petroleum oil containing a minimum of 10 percent pentachlorophenol thickened to a grease consistency with either clay-type thickening agents or an internal gel phase. Other preservative formulations, either liquid or gelled types, or those containing dispersed preservative salts could also be utilized.

A feature of the invention, according to a preferred embodiment thereof, is that the reciprocatory drive means is a double-acting hydraulic cylinder containing a reciprocatory piston, the preservative material being used as the working hydraulic fluid and the cylinder being used to meter the supply of the material to the spade.

In order that the invention may be readily understood, one apparatus in accordance with the invention will now be described, by way of example, with reference to the accompanying drawings. In the drawings.

Figure 1:
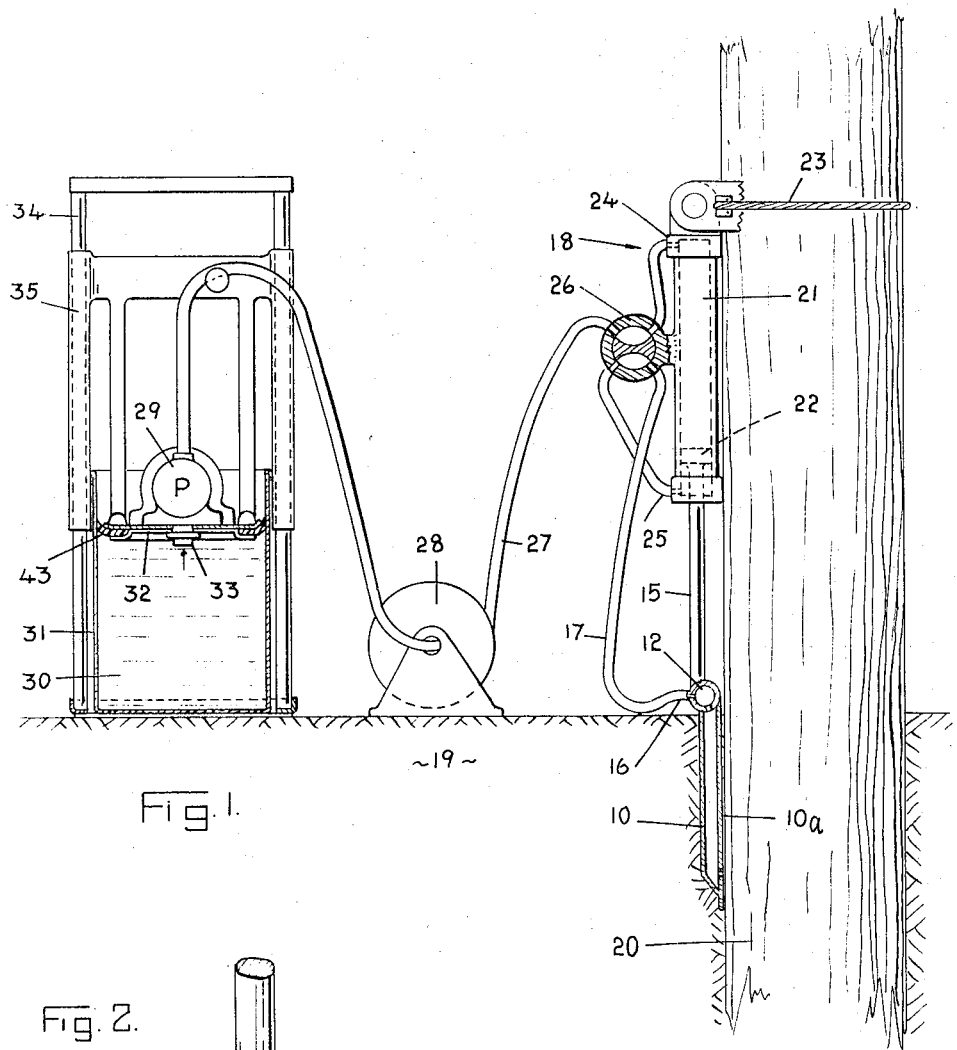
FIG. 1 is a partly diagrammatic showing of the complete apparatus, the apparatus being operatively mounted in relation to a pole, such as a utility pole, to be treated.
Figure 2:
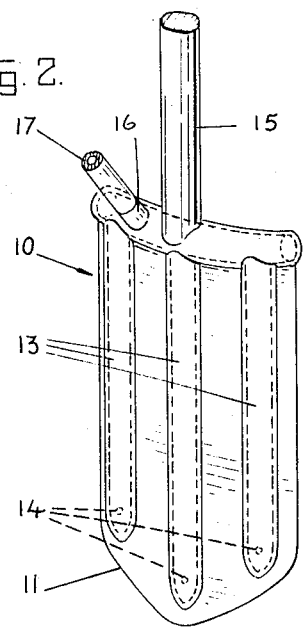
FIG. 2 is a general perspective view of the injection tool of the apparatus.

An essential component of the apparatus shown in FIG. 1 is the injection tool 10, which is shown in greater detail in FIG. 2. The injection tool 10 is in the form of a spade of welded steel construction, having a lower cutting edge 11 to facilitate its being driven into the ground. The construction is such that as the spade is driven vertically into the ground with its operative face against the pole surface, it displaces the soil contacting the pole surface without abrading or damaging the wood. Connected along the upper edge of the spade is a header 12, from which three passageways 13 extend along the rear face and terminate at small orifices 14 opening into the concave operative face 10a of the spade. A vertical connecting rod 15 is rigidly connected to the spade at its upper edge. The header 12 has an inlet 16 for the supply of preservative material, to which inlet a supply pipe 17 is connected.

Referring now more particularly to FIG. 1, the apparatus comprises reciprocatory power means 18 connected to the spade 10 for driving the spade vertically into the ground 19, the operative face 10a of the spade being disposed as close as possible to the surface of the pole 20 to be treated. The reciprocatory power means 18 comprises a double-acting hydraulic cylinder 21 having a reciprocatory piston 22 slidable in the cylinder, the cylinder being securely mounted in position on the pole 20 by a chain or cable 23, and the spade 10 being connected to the piston 22 by the connecting rod 15. The cylinder 21 is provided with inlet connections 24, 25 at its upper and lower ends respectively, by which preservative material may be supplied under pressure alternately to the cylinder spaces above and below the piston, thereby to lower and raise the piston.

The supply of preservative material to the hydraulic cylinder 21 is controlled by means of a two-piston selector valve 26. This valve is shown as a simple rotary type selector valve in the drawing, although it could equally well be a selector valve of the spool type. The valve 26 has a casing providing four ports connected respectively to a supply hose 27, the cylinder inlet 24, the spade header inlet 16 by way of the pipe 17, and the cylinder inlet 25. The movable member of the valve is arranged so as to direct pressurized preservative material from the supply hose 27 to a selected one of the two cylinder spaces, while at the same time connecting the other cylinder space to the spade header inlet 16. The valve 26 effectively has two operative positions. In one valve position, preservative material under pressure is admitted to the cylinder 21 via the inlet 24, the spade 10 thereby being driven into the ground, and preservative material being at the same time expelled from the lower cylinder space, via the connection 25, to the spade passageways 13 and out via the orifices 14. In the other valve position preservative material under pressure is admitted to the cylinder 21 via the inlet 25, the spade 10 thereby being withdrawn from the ground, and preservative material being at the same time expelled from the upper cylinder space, via the connection 24, to the spade passageways 13 and out through the orifices 14.

The reciprocatory means 18 thus serves not only as a driving means for the spade, but also as a metering device by which a measured quantity of preservative material is injected into the ground against the pole surface and uniformly applied over the surface simultaneously with each upward and downward spade stroke.

The supply hose 27 is conveniently mounted on a reel 28. The inlet end of the hose 27 is connected to the outlet of a self priming gear type pump 29 which provides a pressurized source of the preservative material. The material, indicated at 30, is contained in a vertically oriented cylindrical vessel 31, constituting a supply reservoir. The vessel 31 has an axially slidable closure 32, having a neoprene rubber sealing gasket 43 which makes a peripheral seal with the internal wall of the vessel, so that the material can only flow from the vessel via a central passage 33 in the closure 32 when the latter moves downwards. The closure 32 is guided for vertical movement by a vertical frame 34 on which a slide 35, to which the closure is connected, is slidably mounted. The pump 29 is securely mounted on the upper surface of the closure 32, so that the latter is biassed downwardly by the weight of the pump. The preservative material is thus forced through the passage 33 into the pump inlet ensuring that the pump is primed.

Figure 3:
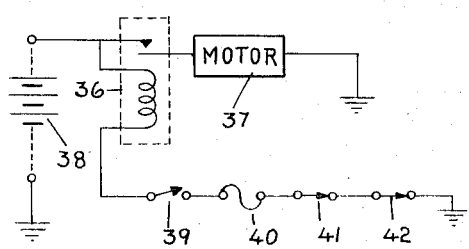
FIG. 3 is a circuit diagram of an electrical control circuit for the apparatus.

The apparatus is operated from a low voltage power supply, such as a 12 volt battery. The supply circuit is illustrated in FIG. 3. This comprises a control solenoid 36, which when energised connects the pump drive motor 37 in circuit with the supply battery 38. The solenoid 36 is connected in circuit with an ON-OFF toggle switch 39, and for safety purposes with a fuse 40, a pressure sensitive switch 41 responsive to pumping pressure, and a further switch 42 located in the vessel 31 which opens when the vessel is empty. The pressure sensitive switch 41 is adapted to open when the pressure on the output side of the pump reaches 2,000 p.s.i., and to close again when the pressure falls to 1,800 p.s.i.

An apparatus in accordance with the invention is compact, light, and readily portable. The spade form of the injection tool contributes to the robustness of the apparatus and ensures that the preservative material is injected into the region where it is needed, i.e., directly against the surface of the pole, without wasteful dispersion. Moreover, the apparatus can be operated by a single operator, and by reason of the fact that the preservative material serves also as the hydraulic fluid only a single pressure source is required. The ejection of the material in synchronism with the upward and downward movements of the spade ensure an even distribution of preservative over the pole area being treated.

What is claimed is:

1. Apparatus for applying preservative material to erected poles at below ground levels, comprising:
   a spade adapted to be driven vertically into the ground, the spade providing internal passageways opening into an operative face thereof;
   a pressurized source of preservative material;
   a double-acting cylinder having a reciprocatory piston therein, the piston defining first and second cylinder spaces within the cylinder;
   means for holding the cylinder vertically in position on a pole to be treated;
   connector means rigidly connecting the spade to the piston; and conduit means interconnecting both said internal passageways and said pressurized source with each of said cylinder spaces respectively,
   said conduit means including a change-over valve for reversing the connections to the cylinder spaces whereby to effect alternate piston strokes, with explulsion of the preservative material from said cylinder spaces and through said passageways on each stroke.

2. Apparatus according to claim 1, wherein the pressurized source comprises a reservoir of preservative material and a self-priming pump for pumping the material from the reservoir.

3. Apparatus according to claim 2, wherein the reservoir comprises a vertically oriented cylindrical vessel having an axially slidable closure making a peripheral seal with the wall of the vessel, the closure having a passage therein for the throughflow of preservative material, and the pump being mounted on the closure so as to bias the closure axially downwards and to receive the material flowing through said passage.

4. Apparatus according to claim 3, wherein the pump is controlled in accordance with the operation of a pressure switch responsive to pump pressure.

* * * * *